United States Patent
Iimura

(10) Patent No.: US 6,958,958 B2
(45) Date of Patent: Oct. 25, 2005

(54) DISK DRIVE DEVICE

(75) Inventor: Shinichiro Iimura, Tokyo (JP)

(73) Assignee: Sony Corporation, Tokyo (JP)

( * ) Notice: Subject to any disclaimer, the term of this patent is extended or adjusted under 35 U.S.C. 154(b) by 587 days.

(21) Appl. No.: 10/142,532

(22) Filed: May 9, 2002

(65) Prior Publication Data

US 2002/0181357 A1 Dec. 5, 2002

(30) Foreign Application Priority Data

May 11, 2001 (JP) ........................................ 2001-141491

(51) Int. Cl.⁷ .............................................. G11B 7/00
(52) U.S. Cl. ................................ 369/47.22; 369/47.25; 369/124.1
(58) Field of Search .......................... 369/47.22, 47.25, 369/47.28, 47.36, 47.35, 124.1, 124.12, 44.36, 44.35

(56) References Cited

U.S. PATENT DOCUMENTS 6,614,745 B1 * 9/2003 Takeda et al. .......... 369/124.13

* cited by examiner

*Primary Examiner*—Nabil Hindi
(74) *Attorney, Agent, or Firm*—Oblon, Spivak, McClelland, Maier & Neustadt, P.C.

(57) ABSTRACT

During recording operations, decay processing is performed with regard to reflected light information signals (I1 and I2) during periods wherein the laser output is recording power which is comparatively high level, i.e., wherein data pits are being formed on the disk, and during recording operations, decay processing is not performed with regard to reflected light information signals during periods wherein the laser output is reproducing power which is comparatively low level, i.e., wherein the pits are not being formed on the disk. Accordingly, address information can be extracted in a stable manner while recording.

14 Claims, 14 Drawing Sheets

DISK DRIVE DEVICE

BACKGROUND OF THE INVENTION

1. Field of the Invention

The present invention relates to a disk drive device which performs recording on a disk recording medium such as an optical disk or the like.

2. Description of the Related Art

Recording data on a disk necessitates means for guiding in order to form data tracks, and to this end, grooves are formed beforehand as pre-grooves, with the grooves or lands (portions between grooves with plateau-shaped cross-sectional forms) being used as data tracks.

Also, there is the need to register address information so that data can be recorded on predetermined locations on data tracks, and this address information is recorded by wobbling the grooves or recorded by forming pre-pits on the data tracks.

For example, with DVDs (Digital versatile Disks), DVD-RWs which are phase-change writable disks, and DVD-Rs which are organic dye change write-once type disks, as shown in FIG. 11, wobbling grooves G are formed on the disk as a pre-format, and land pre-pits LPP are formed on the land L portions between the grooves G.

In this case, the reflected light information obtained by the wobbling grooves is used for disk rotation control and generating recording master clocks and so forth, and the land pre-pits are used for determining precise recording positions in increments of bits, and obtaining various types of information regarding the disk such as pre-addresses and the like. That is to say, address indicating physical locations on the disk are recorded as land pre-pits LPP.

Disk drive devices compatible with such disks read out addresses recorded on the disk as land pre-pits LPP for example, while reproducing or recording, and perform various types of control such as confirming the location of the disk that is being recorded to or reproduced from.

However, with disk drive devices, laser irradiation is consecutively performed on a disk at the time of reproducing, at a reproducing power which is comparatively low level, and the data recorded on the tracks and the above-described land pre-pits LPP information and wobbling groove information is read out from the reflected light information thereof.

On the other hand, at the time of recording, there is the need to read out the information of the land pre-pits LPP for address detection, but the laser irradiation at the time of recording is output at a comparatively high recording power for forming pits on the tracks. More specifically, in the case of recording operations on DVD-Rs or DVD-RWs, the recording power and reproducing power is switched over in pulse fashion in the periods for forming data pits on the tracks, and reproducing power is output in periods for not forming data pits.

At the time of such recording operations, reading address information from land pre-pits LPP for example, is difficult.

FIGS. 12 through 14 illustrate an example of a conventional address information detecting method for when recording.

Addresses are basically detected from push-pull signals P/P which are reflected light information. The drawings illustrate a state wherein a laser spot LS is irradiated on a track formed of tracks and lands, with push-pull signals P/P being obtained as the reflected light information of the laser spot LS. Though the drawings omit illustrations of the photo-inductor for detecting the reflected light and the computation circuit, in order to obtain push-pull signals P/P, first, a reflected light amount signal I2 equivalent to the right half of the laser spot LS in the diagram as to the track line, and a reflected light amount signal I1 equivalent to the left half thereof, are extracted as reflected light information.

In the example shown in FIG. 12, the reflected light information signals I1 and I2 are each subjected to decay processing at the attenuators 101 and 102. The attenuators 101 and 102 are supplied with read/write signals for distinguishing between recording operations and reproducing operations, and are controlled to execute decay processing only during recording operation.

Accordingly, while reproducing, decay is not performed by the attenuators 101 and 102, so the reflected light information signals I1 and I2 are in that state subjected to subtraction of I1 minus I2 at a subtracter 103, to form a push-pull signal P/P. While recording, the reflected light information signals I1 and I2 are subjected to decay processing at the attenuators 101 and 102 and then subjected to subtraction of I1 minus I2 at the subtracter 103, to form a push-pull signal P/P.

Then, the push-pull signal P/P is compared with a predetermined slice level at a comparator 104 and binarized, and taken as the detection information of the land pre-pits LPP. The detected information of the land pre-pits LPP is supplied to a later unshown address decoder, whereby the address value is detected.

However, with the method shown in FIG. 12, the information of the land pre-pits LPP cannot be detected well at the time of recording in actual use, and the address error rate is quite poor.

With the example shown in FIG. 13, the reflected light information signals I1 and I2 are subjected to decay processing at the attenuators 101 and 102 in the same manner as with the above FIG. 12, at the time of recording.

Subsequently, the output of the attenuators 101 and 102 is subjected to addition of I1+I2 at an adder 105, and the addition results are supplied to dividers 106 and 107. Also, the output of the attenuator 101 is supplied to the divider 106, and the output of the attenuator 102 is supplied to the divider 107.

At the divider 106, computation of I1/(I1+I2) is performed, and computation of I2/(I1+I2) is performed at the divider 107. Each of the division results are supplied to the subtracter 103 and subtracted, thereby obtaining a push-pull signal P/P. The push-pull signal P/P is then binarized by the comparator 104, and taken as the detection information of the land pre-pits LPP.

With this method, the address error rate during recording operations are improved over those of the method in FIG. 12, but there is a margin of error in the division processing itself, so the degree of improvement in the error rate is not greatly improved. Also, the dividers 106 and 107 are expensive, so there are difficulties price-wise, as well.

In the example in FIG. 14 as well, the reflected light information signals I1 and I2 are subjected to decay processing at the attenuators 101 and 102, as with the example shown in FIGS. 12 and 13.

However, in this case, AGC circuits 108 and 109 are disposed before the attenuators 101 and 102, so the amplitude levels of the reflected light information signals I1 and I2 are made constant. Other configurations are the same as shown in FIG. 12.

With this method as well, the address error rate during recording operations is improved over that shown in FIG. 12, but the degree of improvement in the error rate is not very great.

Also, combining an AGC circuit such as shown in FIG. 14 with the method shown in FIG. 13 is not a fundamental improvement.

Thus, conventionally, there has been a problem in that detection of address information as information and the like of land pre-pits LPP at the time of recording is difficult.

SUMMARY OF THE INVENTION

The present invention has been made in light of the above-described problems, and accordingly, it is an object thereof to execute excellent address information detection at the time of recording with a disk drive device.

To this end, a disk drive device according to the present invention comprises: recording means for recording data on a disk-shaped recording medium by driving a laser based on recorded data; reflected light detecting means for detecting reflected light accompanying output of the laser and obtaining reflected light information signals; decay means for decaying reflected light information signals obtained by the reflected light information detecting means during recording operations of the recording means, based on decay control signals; address extracting means for obtaining address information from reflected light information signals decayed by the decay means; and decay control signal generating means for generating the decay control signals so as to execute decaying at the decay means, in a period of the reflected light information signals, corresponding to at least a period wherein the output of the laser is at recording power.

The reflected light information signal may comprise a first reflected light information signal and a second reflected light information signal, and the decay means may have first decay means corresponding to the first reflected light information signals and second decay means corresponding to the second reflected light information signals, with the address extracting means obtaining address information from push-pull signals as the difference computation results of the output of the first decay means and the output of the second decay means.

The recording means may generate encoded data by encoding processing of data to be recorded, further generate laser driving pulses based on the encoded data, and drive the laser based on the laser driving pulses; with the decay control signal generating means performing delay processing with regard to the encoded data or the laser driving pulses to generate the decay control signals.

The delay time in the delay processing may be a time equivalent to the time difference between a period wherein the output of the laser is at recording power, and a period wherein the reflected light information signals corresponding to a period wherein the output of the laser is at recording power are subjected to decay processing at the decay means.

The delay time in the delay processing may be determined based on the results of comparing the encoded data or the laser driving pulses, and the reflected light information signals.

The recording means may generate encoded data by encoding processing with regard to data to be recorded, further generate laser driving pulses based on the encoded data, drive the laser based on the laser driving pulses, with the decay control signal generating means generating the decay control signals such that the reflected light information signals are subjected to decay processing in a period longer than a period wherein the output of the laser is at recording power based on the laser driving pulses.

The decay control signal generating means may generate the decay control signals so that the reflected light information signals are subjected to decay processing in a period based on the pulse width of the encoded data.

The decay ratio of the decay means may be set so as to be lower than the ratio of the recording power of the output of the laser and the reproducing power thereof. The decay ratio of the decay means may be set so as to be 1/2 or less than the ratio of the recording power of the output of the laser and the reproducing power thereof.

The decay means may decay the reflected light information signals based on voltage from sampling/holding of the reflected light information signals corresponding to a period wherein the laser output is at reproducing power.

The reflected light information signal may comprise a first reflected light information signal and a second reflected light information signal, and the decay means may have first decay means corresponding to the first reflected light information signals and second decay means corresponding to the second reflected light information signals; with the address extracting means obtaining address information from difference computation signals of the output of the first decay means and the output of the second decay means, and the disk drive device further comprising first and second amplitude control means for making the envelope level of the first and second reflected light information signals constant, upstream from the first and second decay means.

According to the present invention configured thus, during recording operations, decay processing is performed with regard to reflected light information signals during periods wherein the laser output is recording power which is comparatively high level, i.e., wherein data pits are being formed on the disk, and during recording operations, decay processing is not performed with regard to reflected light information signals during periods wherein the laser output is reproducing power which is comparatively low level, i.e., wherein the pits are not being formed on the disk.

DESCRIPTION OF THE PREFERRED EMBODIMENTS

Figure 1:
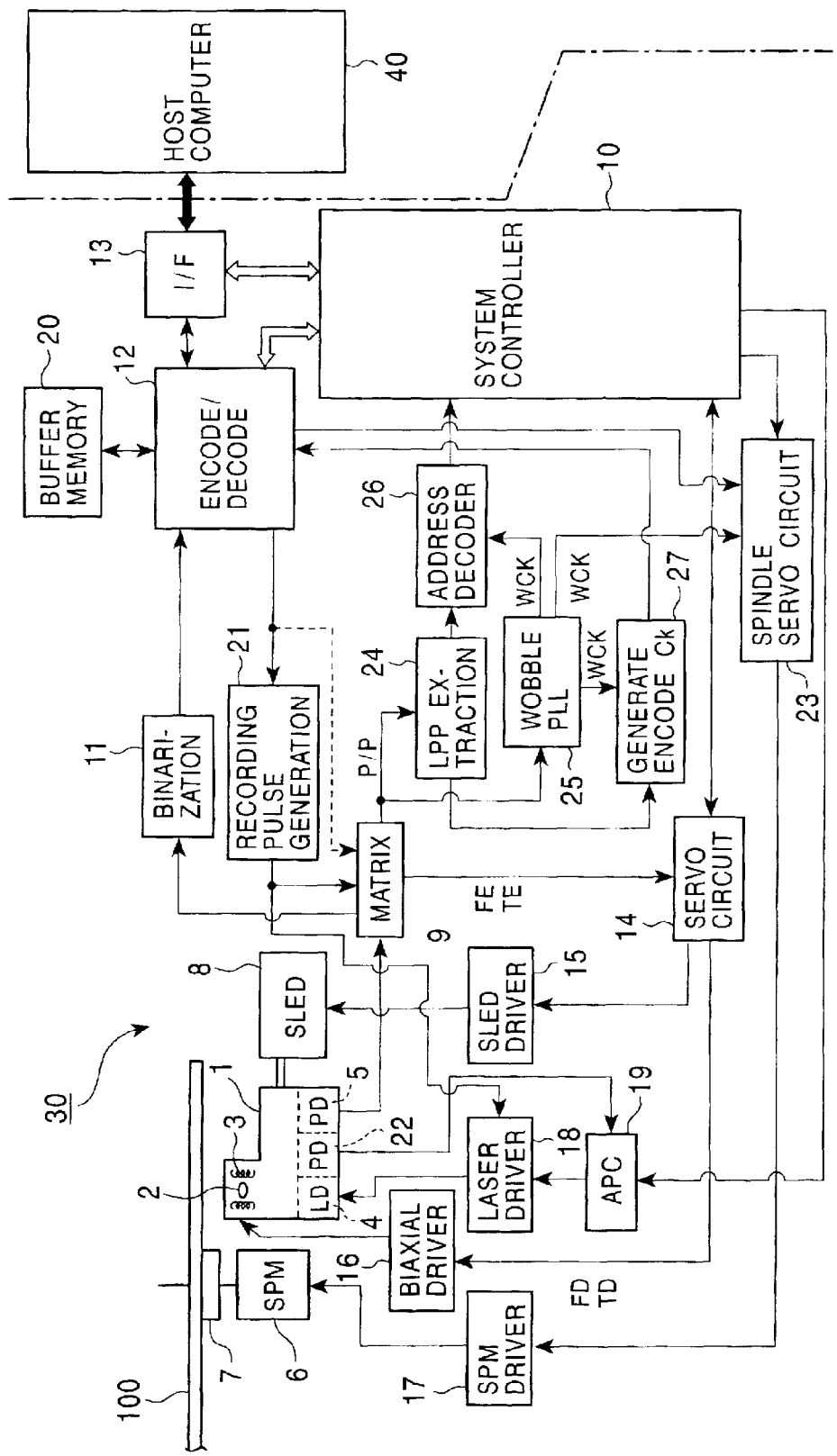
FIG. 1 is a block diagram of a disk drive device according to an embodiment of the present invention.

The following is a description of a disk drive device (recording/reproducing device) for DVD-Rs and DVD-RWS, as an embodiment of the present invention. The description will be made in the following order.
1. Configuration of the disk drive device
2. Configuration for address information detection
3. First attenuation control signal generating method
4. Second attenuation control signal generating method
5. Address error rate
    1. Configuration of the Disk Drive Device
FIG. 1 illustrates the configuration of a disk drive device 30 according to the present example.

A disk 100 serving as a DVD-R or DVD-RW is loaded on the turntable 7, and rotationally driven at a constant linear velocity (CLV) by a spindle motor 6 at the time of recording/reproducing operations. Pit data, track wobbling information, and land pre-pit information, recorded on the tracks on the disk 100, are read out by an optical pick-up 1. Pit recorded as data on tracks which are formed as grooves are so-called dye change pits or phase change pits.

Formed within the pick-up 1 are a laser diode 4 serving as the laser beam source, a photo detector 5 for detecting reflected light, an object lens 2 serving as the output end of the laser beam, and an optical system (not shown) irradiating the laser beam onto the recording face of the disk via the object lens 2 and guiding the reflected light thereof to the photo detector 5.

Also, a monitoring detector 22 which receives a part of the output light from the laser diode 4 is also provided.

The laser diode 4 outputs a laser beam with the wavelength of 650 nm or 635 nm. The NA of the optical system is 0.6.

The object lens 2 is held by a biaxial mechanism 3 so as to be movable in the tracking direction and focus direction.

Also, the entire pick-up 1 is movable in the radial direction of the disk by a sled mechanism 8.

Also, the laser diode 4 in the pick-up 1 is driven so as to emit laser beams by drive signals (drive current) from the laser driver 18.

Reflected light information from the disk 100 is detected by the photo detector 5, changed into electric signals according to the amount of light received, and supplied to matrix circuit 9.

The matrix circuit 9 comprises a current-voltage converting circuit corresponding to the output current from multiple photo-receptors serving as the photo detector 5, as the matrix computation/amplification circuit, etc., and generates necessary signals by matrix computation processing.

For example, RF signals equivalent to reproduced data, focus error signals FE for server control, tracking errors signals TE, etc., are generated.

Further, push-pull signals P/P are generated as signals relating to land pre-pits and groove wobbling.

The circuit configuration for generating the push-pull signals P/P in the matrix circuit 9 will be described later.

The RF signals output from the matrix circuit 9 are supplied to the binarization circuit 11, the focus error signals FE and tracking error signals TE to the servo circuit 14, and a push-pull signals P/P to the land pre-pit extraction unit 24 and wobble PLL 25, respectively.

The push-pull signals P/P are binarized at the land pre-pit extraction unit 24 and supplied to the address decoder 26 as land pre-pit information, and address information preformatted by the address decoder 26 is decoded. The decoded address information is supplied to the system controller 10.

Also, a wobble clock WCK is generated from the push-pull signals P/P, by PLL operations at the wobble PLL 25. This wobble clock WCK is supplied to the encode clock generating unit 27, address decoder 26, and spindle servo circuit 23.

The RF signals obtained at the matrix circuit 9 are binarized at the binarization circuit 11, and supplied to the encode/decode unit 12.

The encode/decode unit 12 has a functional portion serving as a decoder for when reproducing, and a functional portion serving as an encoder for when recording.

Demodulation processing of the run-length limited code, error correction processing, de-interleaving, and like processing is performed as decoding processing at the time of reproduction, thereby obtaining reproduced data.

Also, the encode/decode unit 12 generates reproducing clocks synchronized with the RF signals by PLL processing, with the above decoding processing being executed based on the reproducing clocks.

At the time of reproduction, the encode/decode unit 12 accumulates the data decoded as described above in the buffer memory 20.

For reproduction output from the disk drive device 30, the data buffered in the buffer memory 20 is read out, and transferred as output.

The interface unit 13 is connected to an external host computer 40, and performs communication with the host computer 40, of recorded data, reduction data, various commands, etc.

At the time of reproduction, the reproduction data that has been decoded and stored in the buffer memory 20 is transferred and output to the host computer 40 via the interface unit 13.

Read commands, write commands, and other signals from the host computer 40, are supplied to the system controller 10 via the interface unit 13.

On the other hand, at the time of recording, recording data is transferred from the host computer 40, and the recording data is sent from the interface unit 13 to the buffer memory 20 and buffered.

In this case, the encode/decode unit 12 executes encoding such as addition of error correction code, interleaving, sub-coding, and run-length limited code conversion as recorded data to the disk 100, etc., as encoding processing for the recording data that has been buffered.

At the time of recording, the encoding clock which is the reference clock for encoding processing is generated in a encode clock generating unit 27, and encode/decode unit 12 uses this encoding clock to perform the encoding processing.

The encode clock generating unit 27 generates the encode clock from the wobble clock WCK supplied from the wobble PLL 25, and the land pre-pit information supplied from the land pre-pit extraction unit 24.

The recording data generated by the encoding processing at the encode/decode unit 12 is converted into recording pulses (laser driving pulses) at the recording pulse generating unit 21, and sent to the laser driver 18.

The recording pulse generating unit 21 performs recording compensation, i.e., fine adjustments of optimal recording power and adjustment of laser driving pulse waveforms, with regard to the properties of the recording layer, the spot form of a laser beam, recording linear velocity, etc.

At the laser driver 18, driving current based on the laser drive pulses supplied are provided to the laser diode 4, so that laser emitting driving is performed. Thus, pits (dye change pits/phase change pits) corresponding to the recorded data are formed on the disk 100.

The APC (Auto Power Control) circuit 19 is a circuit unit which performs control such that the output of the laser is constant regardless of temperature in the light, while monitoring the laser output power by output to the monitoring detector 22. The target value for laser output is provided from the system controller 10, and the laser driver 18 is controlled so as to attain that target value.

The servo circuit 14 generates the various servo drive signals for focus, tracking, and sled, from the focus error signals FE and tracking errors signals TE from the matrix circuit 9, thereby executing servo operation.

That is, focus drive signals FD and tracking drive signals TD are generated according to the focus errors signals FE and tracking errors signals TE, and these are supplied to the biaxial driver 16. The biaxial driver 16 drives the focus coil and tracking coil of the biaxial mechanism 3 in the pick-up 1. Accordingly the pick-up 1, matrix circuit 9, servo processor 14, biaxial driver 16, and biaxial mechanism 3, make up a tracking servo loop and focus servo loop.

Also, track jumping operations are executed by turning the tracking servo loop off and outputting jump drive signals to the biaxial driver 16, in response to track jumping commands from the system controller 10.

Also, the servo processor 14 generates sled drive signals based on sled errors signals obtained as low-area components of the tracking errors signals TE, access execution control from the system controller 10, etc., and supplies these to the sled driver 15. The sled driver 15 drives the sled mechanism 8 according to the sled drive signals. Though not shown in the drawing, the sled mechanism 8 has a mechanism comprising a main shaft for holding the pick-up 1, a sled motor, transmission gears, etc., so that the pick-up 1 is slid as necessary by the sled driver 15 driving the sled motor according to the sled drive signals.

The spindle servo circuit 23 performs control for causing CLV rotation of the spindle motor 6.

At the time of recording data, the spindle servo circuit 23 obtains wobble clock WCK generated at the wobble PLL and current rotation velocity information of the spindle motor 6, and compares this with a predetermined CLV reference velocity information, thereby generating spindle errors signals SPE.

Also, at the time of reproducing data, the reproducing clock (clock which is the reference of decoding processing) that is generated by PLL within the encode/decode unit 12 serves as the current rotational velocity information of the spindle motor 6, so comparing this with predetermined CLV reference velocity information generates spindle errors signals SPE.

Then, the spindle servo circuit 23 supplies spindle drive signals generated according to the spindle error signals SPE, to the spindle motor drivers 17. The spindle motor drivers 17 applies, for example, three phase driving signals, according to the spindle drive signals, to the spindle motor 6, thereby executing CLV rotation of the spindle motor 6.

Also, the spindle servo circuit 23 generates spindle drive signals according to spindle kick/break control signals from the system controller 10, so as to execute operations of the spindle motor 6 such as starting, stopping, accelerating, decelerating, etc., by the spindle motor driver 17.

The operations of the servo system and recording/reproducing system such as described above are controlled by the system controller 10, which is formed of a microcomputer.

The system controller 10 executes the various types of processing in response to commands from the host computer 40.

For example, in the event that a read command requesting transfer of particular data recorded in the disk 100 is supplied from the host computer 40, first, seek action control is performed to find the instructed address. That is, a command is issued to the servo circuit 14, and access operations of the pick-up 1 are executed targeting that address specified by the seek command.

Subsequently, operation control necessary for transferring the data in the specified data section to the host computer 40, is performed. That is, data reading/decoding, /buffering, etc., from the disk 100 is performed, thereby transferring the requested data.

Also, upon a write command being at output from the host computer 40, the system controller 10 first moves the pick-up 1 to the address to be written to. Then, encoding processing is executed by the encode/decode unit 12 as described above with regard to the data transferred from the host computer 40.

Recording is executed by laser driving pulses from the recording pulse generating unit 21 being supplied to the laser driver 18, as described above.

The operations in the disk drive device 30 at the time of reproducing and at the time of recording can be summarized as follows.

<Operations at Time of Recording>
Servo Operations

Signals detected by the pick-up 1 are converted into servo margin-of-error signals such as focus error signals FE and tracking errors signals TE at the matrix circuit 9, and sent to the servo circuit 14. The drive signals FD and TD output from the servo circuit 14 drive the biaxial mechanism 3 of the pick-up 1, so as to perform focus servo and tracking servo operations.

Data Reproducing

Signals detected by the pick-up 1 are converted into RF signals at the matrix circuit 9, and sent to the encode/decode unit 12. The channel clock is reproduced at the encode/decode unit 12, and decoding based on the channel clock is executed. The decoded data is sent to the interface unit 13.

Rotation Control

The rotation of the disk 100 is controlled by the channel clock reproduced at the encode/decode unit 12 being sent to the spindle servo circuit 23.

Address Reproduction

Addresses are contained in the RF signals, and are decoded at the encode/decode unit 12 and sent to the system controller 10.

Laser Control

The APC circuit 19 controls that output of the laser so as to be constant, under instructions from the system controller 10.

<Operations at the Time of Recording>
Servo Operations

These are the same as at the time of reproducing, but correction is made at the matrix circuit 9 or servo circuit 14, so there is no increase of gain by increase of laser power.

Recording Data

The data taken in through the interface unit 13 is subjected to ECC addition, sorting, modulation, and other like channel coding, at the encode/decode unit 12. The data subjected to channel coding is converted into laser driving pulses suitable for the disk 100 at the recording pulse generating unit 21, and are applied to the laser diode 4 within the pick-up 1, via the laser driver 18 (APC circuit 19).

Rotation Control

Push-pull signals P/P output from the matrix circuit 9 are taken as the wobble clock WCK at the wobble PLL, and applied to the spindle servo circuit 23, thereby executing constant linear velocity (CLV) rotational control.

Address Reproduction

The push-pull signals P/P output from the matrix circuit 9 are sent to the land pre-pit extraction unit 24, where land pre-pit information is detected. The detected land pre-pit information is decoded into address values at the address decoder 26, and read by the system controller 10.

Also, the land pre-pit information is also sent to the encode clock generating unit 27, for the encode clock is reproduced and applied to the encode/decode unit 12.

Now, though the example shown in FIG. 1 illustrates the disk drive device 30 connected to the host computer 40, there may be arrangements wherein the disk drive device according to the present invention is not connected to a host computer 40 or the like. In this case, the configuration of the interface portion for data input/output is different to that shown in FIG. 1, with operating units, display units, etc., being provided. That is, an arrangement may be made wherein recording and reproducing is performed according to operations of users, and wherein terminal portions are formed for input and output of various types of data.

2. Configuration for Address Information Detection

Figure 2:
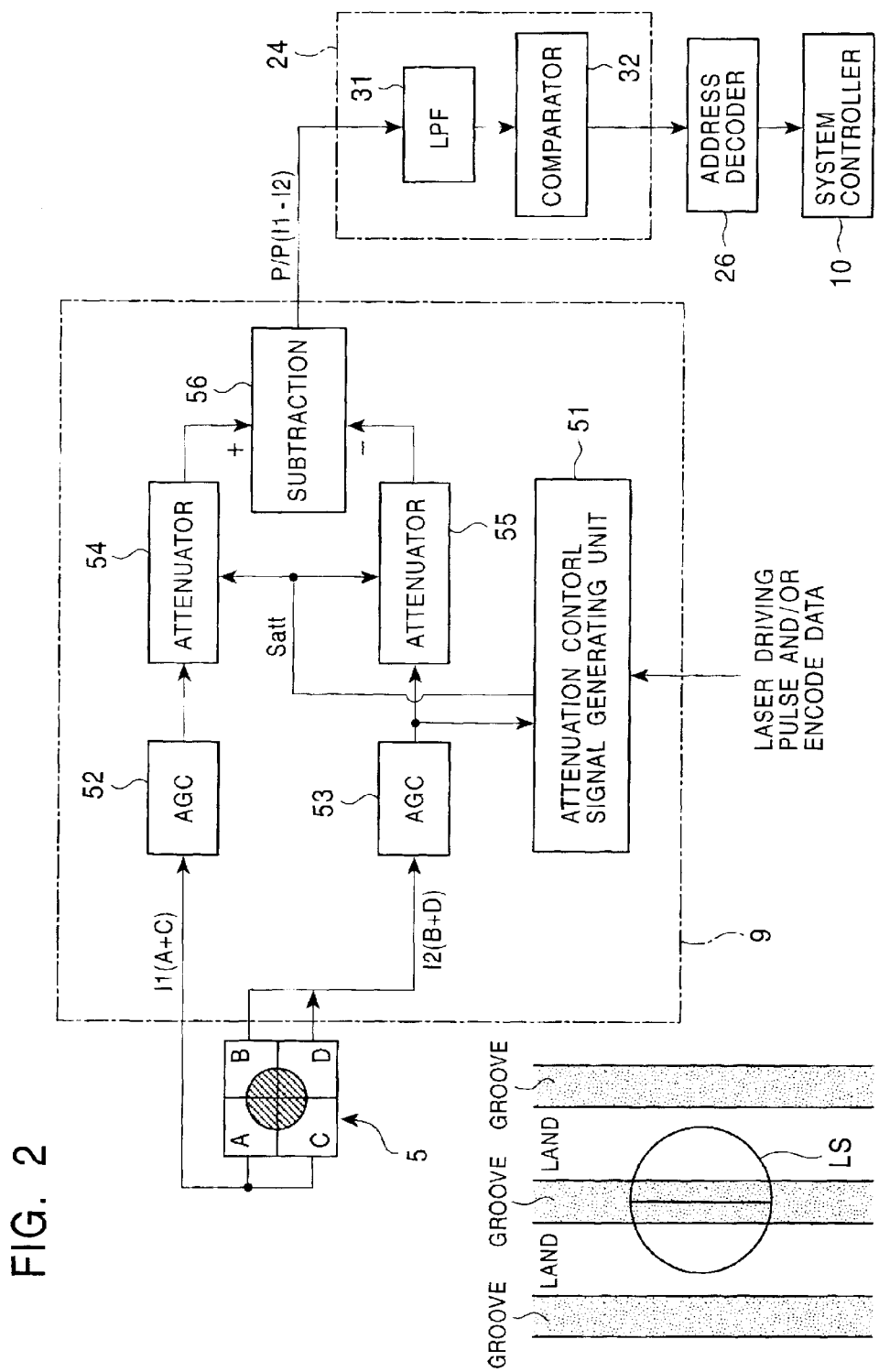
FIG. 2 is a block diagram of a configuration for address extraction with the disk drive device according to the embodiment.
Figure 3:
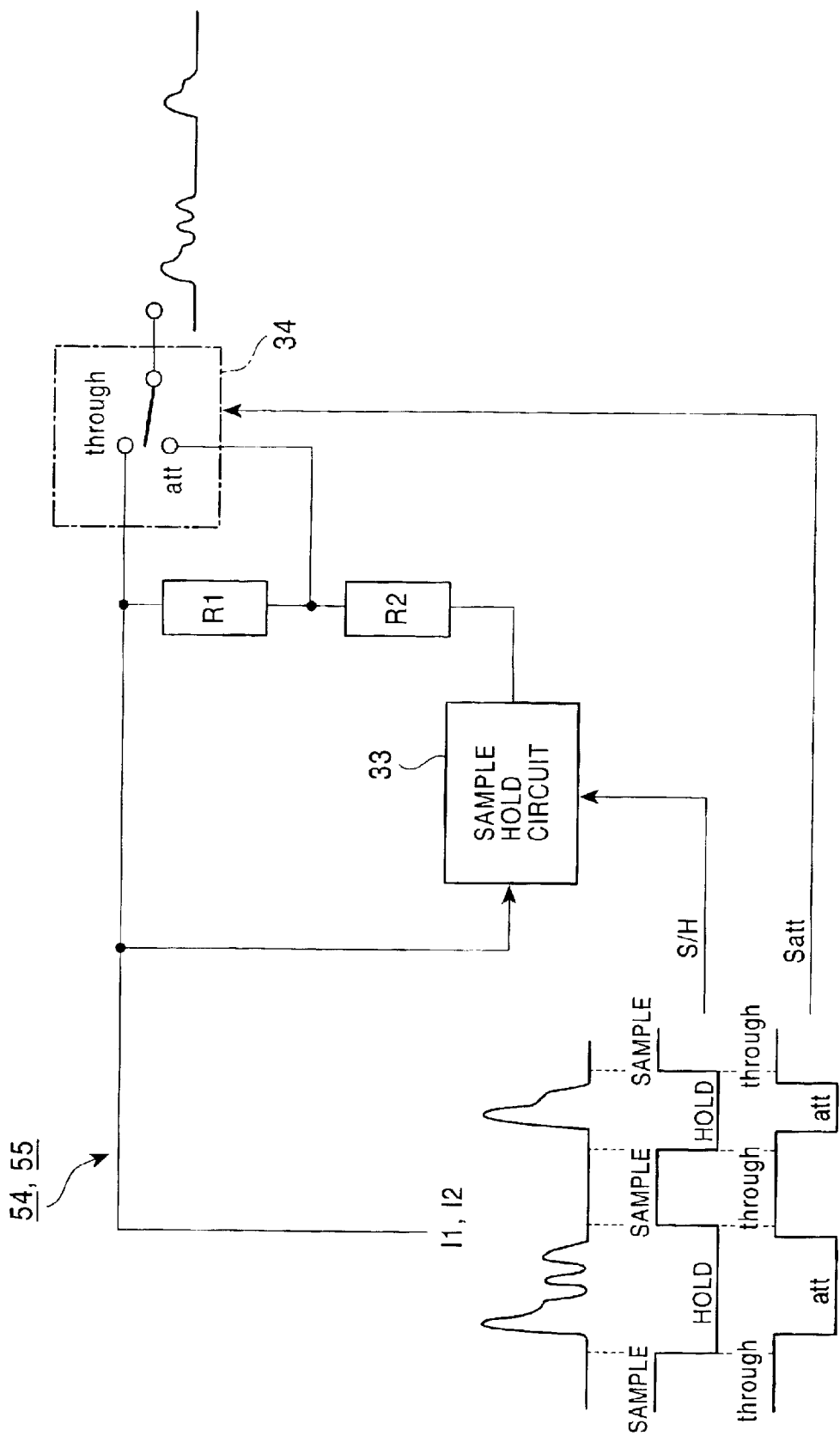
FIG. 3 is a block diagram of an attenuator according to the embodiment.

FIGS. 2 and 3 illustrate configuration for detecting address information recorded as land pre-pits on the disk, with the above-described disk drive device 30.

In FIG. 2, parts indicated for detecting the land pre-pits are the photo-detector 5 within the pick-up 1, matrix circuit 9, land pre-pit extraction unit 24, address decoder 26, and system controller 10.

Now, with the matrix circuit 9, only the circuit configuration portion for generating push-pull signals P/P is shown, and that illustration and description of the circuit configuration portions for generating the above-described RF signals, focus error signals FE, tracking errors signals TE, etc., are omitted.

As shown in the figures, the photo detector 5 is a four-way detector formed of photo-receptors A, B, C, and D, and in actual use, the reflected light detected by the photo-receptors (the current corresponding to the amount of received light) is subjected to current/voltage conversion at the matrix circuit 9, and computation is performed of the signals A, B, C, and D, which have been made into voltage values, so as to generate the necessary signals such as focus error FE, push-pull signals P/P, etc. Here, signals I1 and I2 for generating the push-pull signals P/P will be described, but note that illustration of the computation circuit configuration for current/voltage conversion and obtaining the signals I1 and I2 is omitted. In actual use, the signal I1 is obtained by converting the current obtained by the photo-receptors A and C into voltage, and adding these. Also, the signal I2 is obtained by converting the current obtained by the photo-receptors B and D into voltage, and adding the results.

Also, at the time that a laser spot LS is irradiated on the track as shown in the figure, the signals I1 and I2 for obtaining the push-pull signals P/P are reflected light amount signals equivalent to the left half of the laser spot LS in the figure as to the direction of the track line, and reflected light amount signals equivalent to the right half thereof.

The reflected light information signals I1 and I2 generated from the reflected light received by the photo-detector 5, by computation processing at the matrix circuit 9 are each supplied to AGC circuits 52 and 53, and the amplitude level (envelope) of the reflected light information signals I1 and I2 is made constant.

The push-pull signals P/P are obtained by subtraction of the reflected light information signals I1 and I2, so making the amplitude level of the reflected light information signals I1 and I2 by AGC circuits 52 and 53 is suitable for detection of push-pull signals P/P.

The reflected light information signals I1 and I2 which have been subjected to amplitude adjustment are each supplied to attenuators 54 and 55. That attenuators 54 and 55 are arranged so that decay processing is performed only in the periods wherein recording operations are being performed, and also the laser output is at recording power which is a comparatively high level, i.e., only in the periods of supplying the reflected light information signals I1 and I2 corresponding to the period wherein data pits are formed on the disk, while on the other hand, decay processing is not performed in the periods while reproducing or recording wherein the laser output is at reproducing power which is a comparatively low level, i.e., with regard to the reflected light information signals I1 and I2 corresponding to the period wherein data pits are not formed on the disk.

The timing for such decay processing execution is controlled by attenuation control signals Satt from the attenuation control signal generating unit 51.

Now, two examples of methods for processing generation of the attenuation control signal Satt will be described later.

Also, with regard to processing generation of the attenuation control signal Satt, the reflection light information signals I2 which are the output of the AGC circuit 53 (or the reflection light information signals I1 which are the output of the AGC circuit 52 will suffice as well) are supplied to the attenuation control signal generating unit 51. Further, encode data from the encode/decode unit 12 and/or laser driving pulses from the recording pulse generating unit 21, are supplied to the attenuation control signal generating unit 51.

During the recording operations, the reflected light information signals I1 and I2 are each subjected to be the processing at the attenuators 54 and 55 only at timing (periods) based on the attenuation control signals Satt, and are not decayed at other periods but supplied to the subtracting 56. At the subtracting 56, the subtraction of I1 minus I2 is performed, thus yielding the push-pull signals P/P.

Then, the push-pull signals P/P are supplied to the land pre-pit extraction unit 24, and subjected to band restriction at the low-pass filter 31, and then compared with a predetermined slice level at the comparator 32 and binarized, and thus taken as detection information of the land pre-pits LPP. This land pre-pit LPP detection information is supplied to the address decoder 26 and address value is detected, and read by the system controller 10.

The attenuators 54 and 55 are each configured as shown in FIG. 3. That is, these comprise a sample/hold circuit 33, switch 34, and resistors R1 and R 2.

Describing the attenuators 54 as to the reflected light information signal I1, the reflected light information signal I1 having a signal waveforms such as shown in the figure for example, i.e., a signal waveforms wherein the amplitude level becomes great when the laser output is at recording power, is supplied to a through terminal (through) of the switch 34, and the sample/hold circuit 33.

Also, the reflected light information signal I1 is divided by the resistors R 1 and R 2, and supplied to the decay terminal (att) of the switch 34.

Here, the connection terminals of the switch 34 are switched over by the attenuation control signal Satt from the attenuation control signal generating unit 51. That is to say, during the reflected light information signal periods corresponding to the periods wherein the laser output is at reproducing power during the recording operation, and the data pits are not formed on the disk, the through terminal (through) is selected for the switch 34, and decay processing is not performed. On the other hand, reflected light information signal periods corresponding to the periods where in the laser output is at recording power and the data pits are formed on the disk, the decay terminal (att) is selected for the switch 34, and divided signals are output. That is to say, decay processing is performed.

The figure shows the waveform of the attenuation control signal Satt alongside the reflected light information signal I1, and as can be understood from this waveform, decay processing is performed in the periods wherein the laser output is at recording power (in reality, recording power and reproducing power are alternately output in pulse fashion for the pit formation timing, and the periods here are the pit formation periods including the reproducing power periods therein).

Note that during reproducing operations, the through terminal (through) of the switch 34 is always selected, and accordingly, decay processing is not performed.

The output of the sample/hold circuit 33 is supplied as a decay reference voltage, with regard to the resistors R 1 and R 2 which perform dividing for decay.

The sample/hold circuit 33 samples the reflected light information signals I1 in the periods wherein the laser output is at reproducing power, and outputs hold output, as can be understood from the control signal waveform S/H thereof. That is, the decay referenced voltage is the voltage of the reflected light information signal I1 in the event that the laser output is at reproducing power.

Note that control signals S/H with regard to the sample/hold circuit 33 become timing signals for instructing sampling at the time that the laser output level is at reproducing power, and accordingly can be generated from the encode data output from the encode/decode unit 12.

Also, the decay reference voltage is the voltage of the reflected light information signal I1 in the event that the laser output is at reproducing power, so the decay ratio set by the resistors R 1 and R 2 are smaller than the ratio of the recording power and reproducing power of the laser output. Particularly, setting the resistors R 1 and R 2 such that R1≦R2 means that the decay ratio is 1/2 or less than the ratio of the recording power and reproducing power of the laser output.

For example, the waveform of the reflected light information signal I1 within a pit formation period for example, initially has a great amplitude level as shown in the figure, but the subsequent amplitude levels become smaller due to the effect of pits immediately being formed by recording power laser irradiation. Accordingly, setting the decay ratio as described above is suitable for decay processing of the reflected light information signal I1 for obtaining push-pull signals P/P.

The configuration for extraction of land pre-pit information and address decoding is as shown in FIGS. 2 and 3 described above, and as can be understood from this configuration, with the present example, a major characteristic is that the decay processing at the attenuators 54 and 55 is performed with regard to reflected light information signals I1 and I2 equivalent to the pit formation periods wherein the laser output is at recording power.

Such decay operation control is executed by the attenuation control signals Satt, and now two examples will be described as methods for generating the attenuation control signals Satt.

3. First Attenuation Control Signal Generating Method

The attenuation control signal Satt performs control such that decay processing is performed with regard to the reflected light information signals I1 and I2 equivalent to the pit (mark) formation periods wherein the laser output is at recording power.

First, this operation will be described with reference to FIG. 5.

Figure 5:
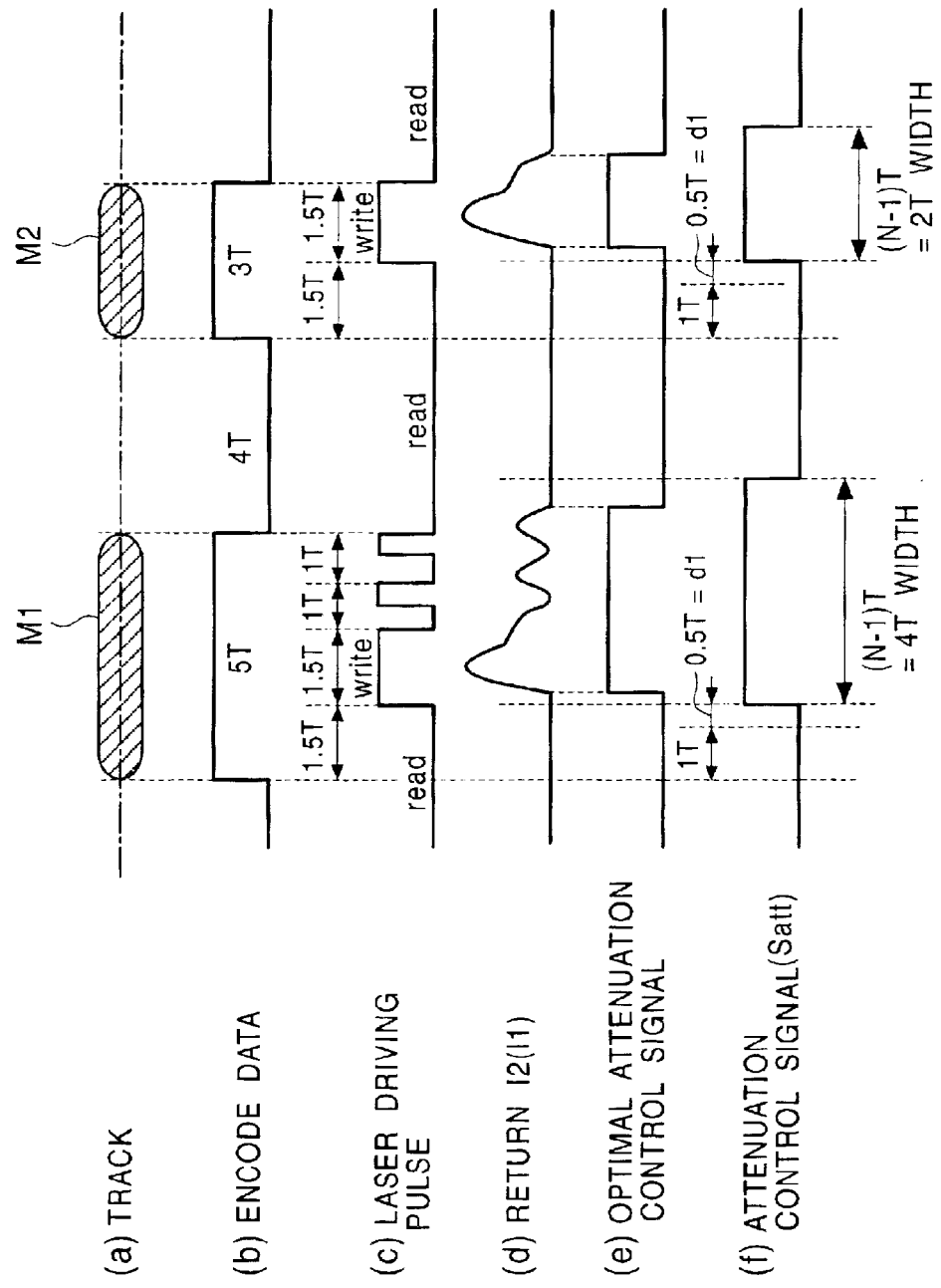
FIG. 5 is an explanatory diagram of a first attenuation control signal generating method according to the embodiment.

Let us say that at the time of recording, the data encoded at the encode/decode unit 12, i.e., the encoded data encoded as run-length limited code, is a stream such as shown by (b) in FIG. 5, for example. That is, in this case, let us say that this is a section wherein, as shown by (a) in FIG. 5, 5 T of marks (pits) M1, and following a 4 T period thereafter, 3 T of marks (pits) M2, are to be formed on the tracks of the disk 100 (T is a unit length equivalent to a channel bit).

In this case, at the recording pulse generating unit 21, laser driving pulses as indicated by (c) in FIG. 5 are generated in response to the input encoded data, and supplied to the laser driver 18.

That is, with regard to the laser driving pulses, pulses (write pulses) at recording power are consecutively output according to the pit length to be formed during the pit formation period. On the other hand, reproducing power is continued during periods wherein pits are not formed.

Actual waveforms of the laser driving pulses are thought of in various ways, so this example is no more than an example, but with the present example, the write pulse rises around 1.5 T delayed from the rising of the encoded data, and continues for a 1.5 T period. Subsequently, a 0.5 T period write pulse is generated across a 0.5 T period, and this is continued to the falling of the encoded data. Accordingly, in the case of 5 T of marks, as shown in the figure, this can be described as 1.5 T read level→1.5 T write pulse→0.5 T read level→0.5 T write pulse→0.5 T read level→0.5 T write pulse.

Though not shown in the figure, in the case of 6 T of marks, 0.5 T read level 0.5 T write pulse are formed in the further remaining one T period.

In the case of 3 T of marks, the 3 T period ends with the 1.5 T read level→1.5 T write pulse, so there are no subsequent 0.5 T write pulses.

The laser output is performed based on such laser driving pulses, so the laser power intermittently becomes greater during pit formation periods.

Due to such laser output being performed, the amplitude of the reflected light amount signals I1 and I2 (returning light) intermittently becomes greater during the pit formation periods. However, there is a delay due to processing analog signals at the photo detector 5 of the pick-up 1 and matrix circuit 9 from the laser output timing, so the effects of laser output fluctuations are represented in the reflected light amount signals I1 and I2 supplied to the attenuators 54 in 55, in a state slightly delayed as to the laser driving pulses shown in (c) in FIG. 5, as indicated by (d) in FIG. 5.

With such reflected light information signals I1 and I2, decay processing by attenuation control signal such as indicated by (e) in FIG. 5 are optimal for operations of the present embodiment.

That is to say, decaying processing of the attenuation control signals indicated by (e) in FIG. 5 at the attenuators 54 and 55 in H level periods, is what decaying processing of the reflected light information signals I1 and I2 equivalent to pit (mark) formation periods wherein the laser output is at recording power with the present example, means.

Accordingly a pulse width equivalent to periods for the decay processing is set for the attenuation control signals Satt, based on encoded data or laser driving pulses, and also the delay time from the laser output timing at recording power to supply of the reflected light information signals I1 and I2 to the attenuators 54 and 55, should be taken into consideration.

However, there is no particular need for decay to be executed in a matter almost perfectly corresponding to the periods of reflected light information signals I1 and I2 equivalent to the laser output periods at recording power as with the attenuation control signals Satt such as shown in (e) in FIG. 5, rather, there is no real problem with executing decay so as to generally cover the periods of the reflected light information signals I1 and I2 equivalent to the laser output periods at recording power, with attenuation control signals Satt such as shown in (f) in FIG. 5.

Specifically, attenuation control signals Satt may be generated with fixed delete time and pulse widths, set beforehand from the rising of the waveforms of the encoded data (or laser driving pulses), for example.

First, a method for generating attenuation control signals Satt using a value set beforehand for delay time and pulse width will be described with reference to FIGS. 4 and 5, as a first attenuation control signal generating method.

For example, the attenuation control signals Satt shown by (e) in FIG. 5 are an example of rising with the delay time of 1.5 T from the rising of the encoded data. The pulse width of the attenuation control signals Satt is (N−1) T as to (N) T of the encoded data.

Figure 4:
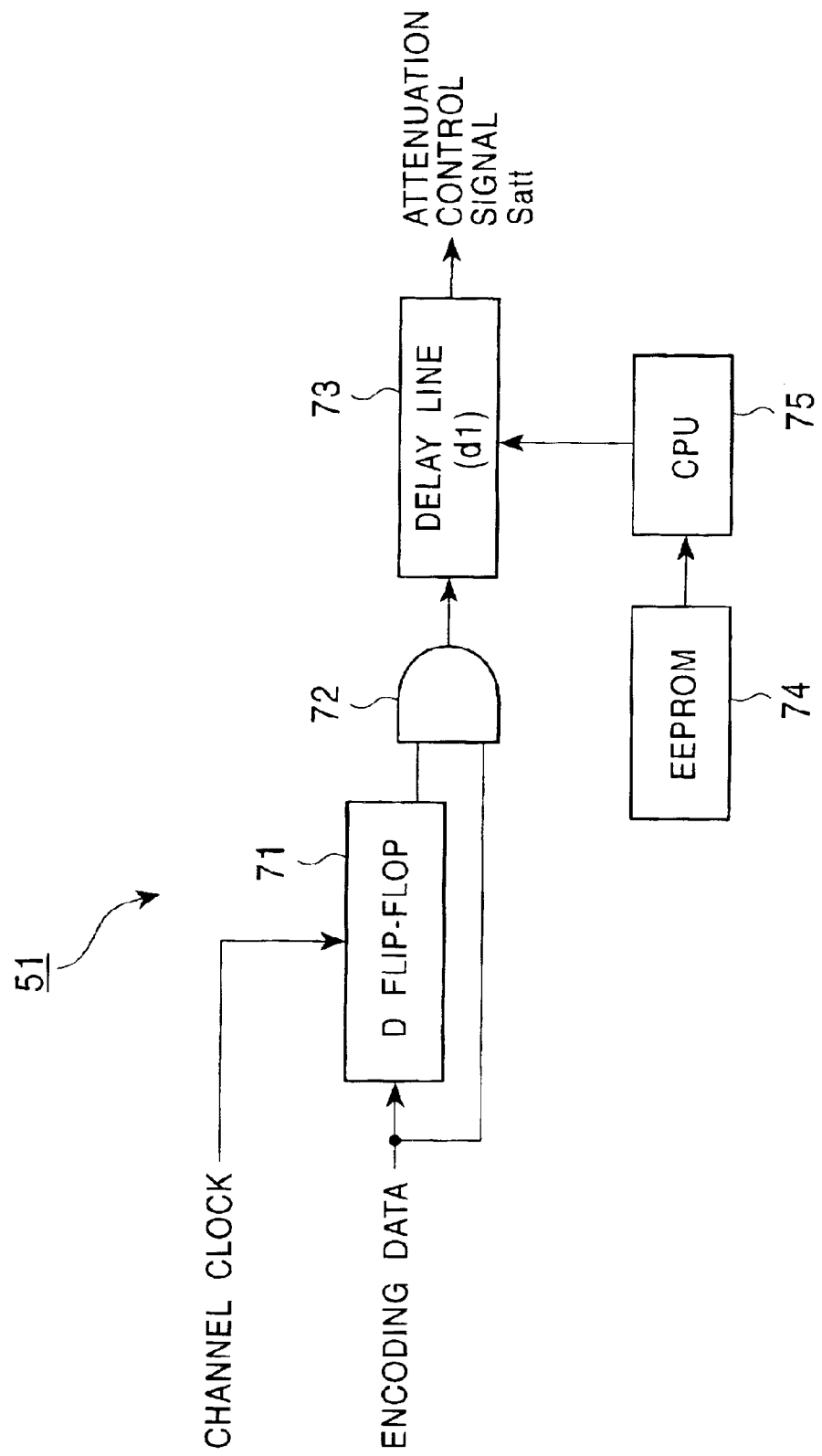
FIG. 4 is a block diagram of an attenuation control signal generating unit according to the embodiment.

In order to generate such attenuation control signals Satt, providing a D flip-flop 71, AND gate 72, delay line 73, EEPROM 74, and CPU 75, as shown in FIG. 4, as the attenuation control signal generating unit 51 shown in FIG. 2, is sufficient. However, an arrangement may be made wherein the system controller 10 executes the functions of the CPU 75, and in this case the CPU 75 does not need to be provided within the attenuation control signal generating unit 51. Also, EEPROM 74 does not necessarily need to be provided within the attenuation control signal generating unit 51, rather, non-volatile memory area, either within the system controller 10 or external, may be used.

In this case, the encoded data and channel clock output from the encode/decode unit 12 are supplied to the attenuation control signal generating unit 51, and the encoded data is supplied to the D flip-flop 71 and AND gate 72. The D flip-flop 71 performs latch output of the encoded data, based on the channel clock. Accordingly, signals supplied to the AND gate 72 are the encoded data and the encoded data delayed by 1 T. Thus, the output of the AND gate 72 is signals which rise with a 1 T delay as to the encoded data, and which have a pulse width of (N−1) T as to (N) T of the encoded data.

The output of the AND gate 72 is delayed by time of d1 at the delay line 73. Here, by making this delay time d1 to be such that d1=0.5 T holds, attenuation control signals Satt wherein pulse width is (N−1) T as to (N) T of the encoded data indicated by (f) in FIG. 5, rising with a 1.5 T delay as to the encoded data, are generated.

The delay time d1 of the delay line 73 is set by the CPU 75. An optimal delay time may be adjusted for the delay time d1 by an adjustment process before shipping, for example, thereby adjusting to an optimal delay time, and setting the value of the delay time d1 as an adjusted value in the EEPROM 74.

Due to such a configuration, generation of attenuation control signals Satt can be realized with an extremely simple structure which also lightens the processing load up on the CPU 75 (or system controller 10).

Of course, using (N−1) T for the pulse width of the attenuation control signals Satt, or setting the delay time d1 to time equivalent to 0.5 T, are no more than an example for description. What is essential is that, as shown by (d) in FIG. 5, the values are such that decay processing is executed in periods capable of covering the periods of the reflected light information signals I1 and I2 equivalent to periods wherein the laser output is at recording power.

4. Second Attenuation Control Signal Generating Method

Next, a method whereby the attenuation control signals Satt can be generated in an almost ideal state such as indicated by (e) in FIG. 5, will be described with reference to FIGS. 6 through 8, as a second attenuation control signal generating method. This does not involve setting fixed delay times or pulse widths beforehand, but rather generates attenuation controls signals Satt with delay times and pulse widths adapted to the actual operating state.

Figure 6:
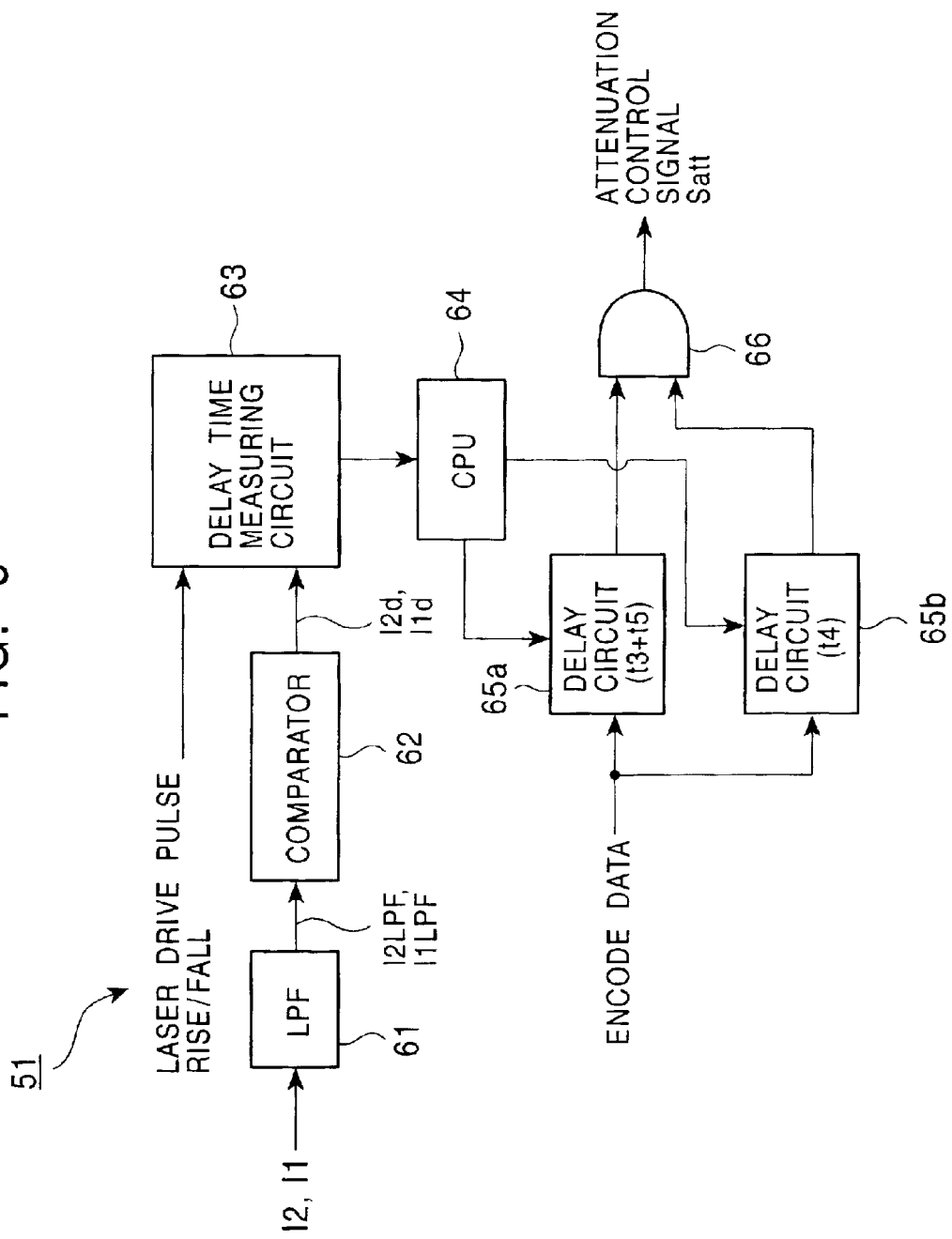
FIG. 6 is a block diagram of an attenuation control signal generating unit according to the embodiment.

In this case, the attenuation control signal generating unit 51 is configured as shown in FIG. 6. That is, a low-pass filter 61, a comparator 62, a delay time measuring circuit 63, a CPU 64, delay circuits 65a and 65b, and an AND gate 66, are provided. Note that the functions of the CPU 64 may be realized by the system controller 10.

First, the reflected light information signal I2, which is the output of the AGC circuit 53 shown in FIG. 2, is input to the low-pass filter 61. While FIG. 2 shows the reflected light information signals I2 being supplied to the attenuation control signal generating unit 51, an arrangement may be made wherein the reflected light information signal I1 is supplied to the attenuation control signal generating unit 51, and input to the low-pass filter 61 shown in FIG. 6.

Figure 7:
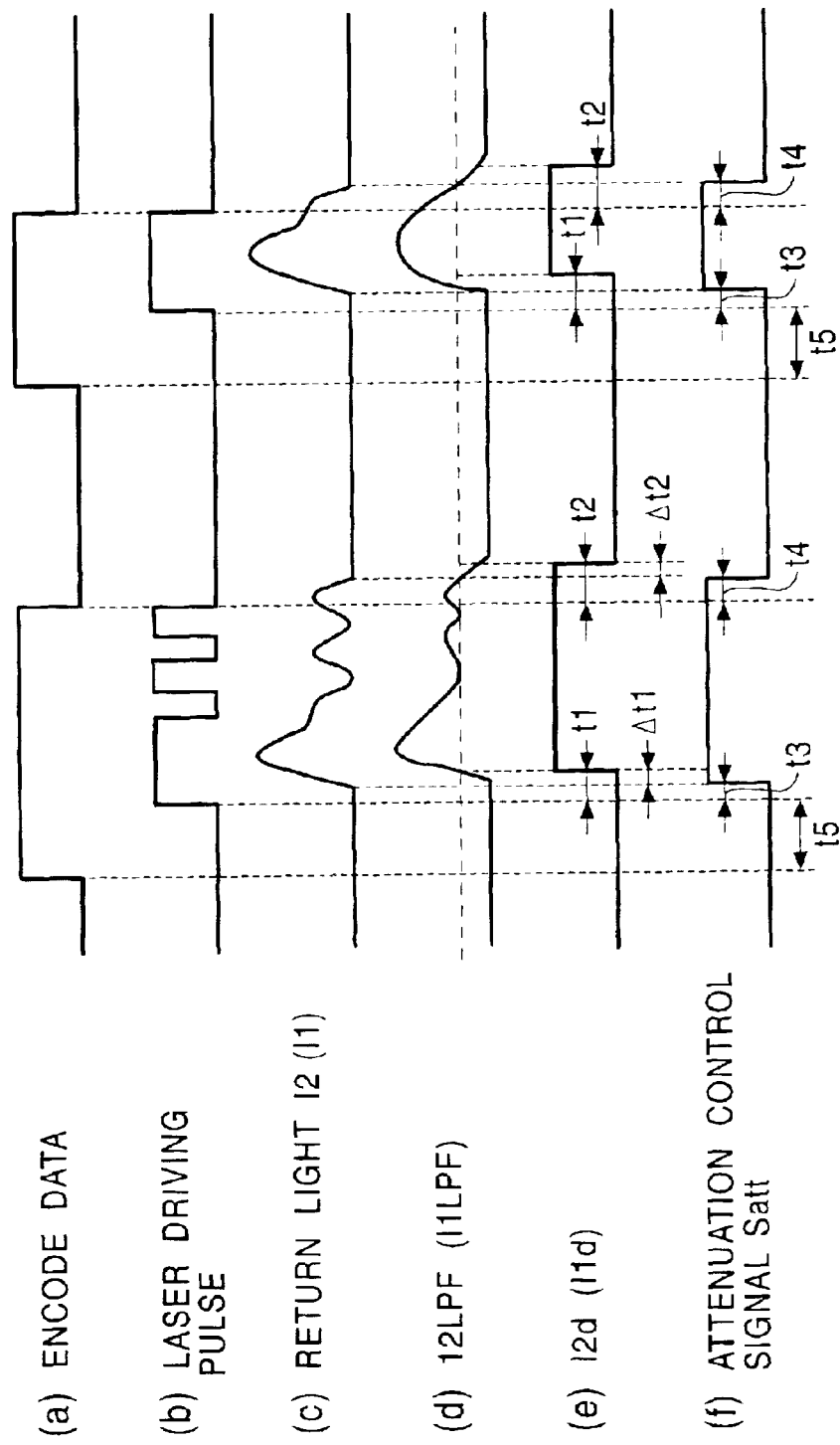
FIG. 7 is an explanatory diagram of a second attenuation control signal generating method according to the embodiment.

For example, the reflected light information signal I2 indicated by (c) in FIG. 7 is filtered by the low-pass filter 61 and changed into the reflected light information signal I2LPF indicated by (d) in FIG. 7, then compared with a predetermined slice level of the comparator 62, binarized, and input to the delay time measuring circuit 63 as the reflected light information signal I2d indicated by (e) in FIG. 7.

Also, the laser driving pulse ((b) in FIG. 7) from the recording pulse generating unit 21 shown in FIG. 1, is also input to the delay time measuring circuit 63.

At the delay time measuring circuit 63, the time difference t1 between the rising of the binarized reflected light information signal I2d indicated by (e) in FIG. 7 and the rising of the laser driving pulse indicated by (b) in FIG. 7 is measured. Also, the time difference t2 between the falling of the reflected light information signal I2d indicated by (e) in FIG. 7 and the falling of the laser driving pulse indicated by (b) in FIG. 7 is measured.

The measured time differences t1 and t2 are sent to the CPU 64.

Figure 8:
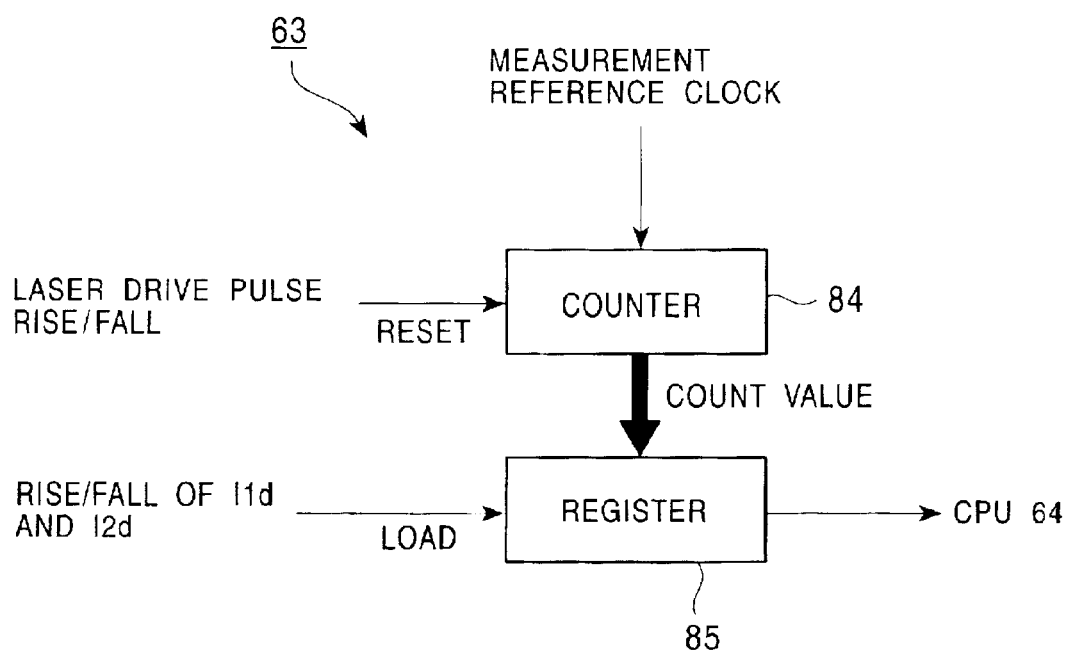
FIG. 8 is a block diagram of a delay time measuring circuit according to the embodiment.
Figure 9:
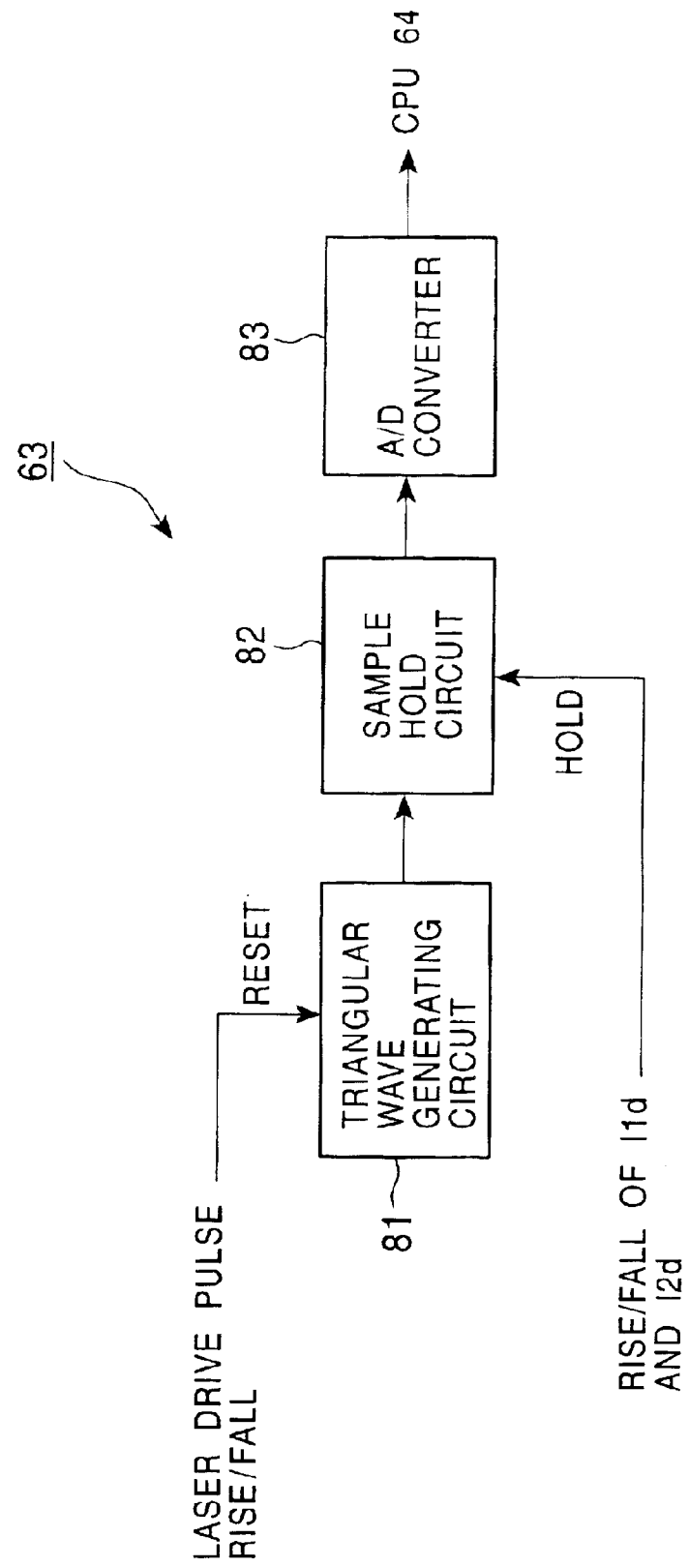
FIG. 9 is another block diagram of a delay time measuring circuit according to the embodiment.

The circuit configuration shown in FIG. 8 for measuring time difference digitally, or the circuit configuration shown in FIG. 9 for measuring time difference by analog means, may be conceived as examples of the delay time measuring circuit 63.

In the case of the arrangement shown in FIG. 8, a counter 84 and register 85 are provided to the delay time measuring circuit 63. The counter 84 counts reference clocks for measurement, while being reset at the rising and falling timing of the laser driving pulses.

The counter value of the counter is loaded to the register 85 at the timing of the rising and falling of the reflected light information signal I2d.

That is to say, the counter value loaded to the resistor 85 at the timing of the rising of the reflected light information signal I2d is time difference t1, and the counter value loaded to the resistor 85 at the timing of the falling of the reflected light information signal I2d is time difference t2. The time differences t1 and t2 are sent to the CPU 64.

In the case of the configuration shown in FIG. 9, the delay time measuring circuit 63 is provided with a triangle wave generating circuit 81, sample/hold circuit 82, and A/D converter 83.

The triangle wave generating circuit 81 generates triangle waves signals, being reset at the timing of rising and falling of the laser driving pulses. The triangle wave signals are supplied to the sample/hold circuit 82, and sampled and held at the timing of rising and falling of the reflected light information signals I2d. The hold output voltage is converted into a digital value by the A/D converter 83, and supplied to the CPU 64.

That is to say, the digital value equivalent to the voltage value wherein the triangle wave signal reset at the rising timing of the laser driving pulse is sampled and held at the timing of the rising of the reflected light information signal I2d, is equivalent to the time difference t1, while the other hand, the digital value equivalent to the voltage value wherein the triangle wave signal reset at the falling timing of the laser driving pulse is sampled and held at the timing of the falling of the reflected light information signal I2d, is equivalent to the time difference t2.

Due to a configuration such as shown in FIG. 8 or FIG. 9, the delay time measuring circuit 63 measures the time difference t1 and t2 shown in FIG. 7, which the CPU 64 reads.

The CPU 64 takes a value obtained by subtracting a predetermined time Δt1 from the time difference t1 as delayed time t3. The CPU 64 also takes a value obtained by subtracting a predetermined time Δt2 from the time difference t2 as delayed time t4.

The predetermined time Δt1 and Δt2 are equivalent to the time difference between the reflected light information signal I2 and the binarized reflected light information signal I2d, i.e., the delay due to the low-pass filter 61 and comparator 62.

Accordingly, as shown in FIG. 7, the delay time t3 is equivalent to the time difference between the rising of the laser driving pulse indicated by (b) in FIG. 7 and the reflected light information signal I2 indicated by (c) in FIG. 7, and the delay time t4 is equivalent to the time difference between the falling of the laser driving pulse and the reflected light information signal I2.

The CPU 64 controls the delay circuits 65a and 65b using the delay time t3 and t4 thus obtained.

Encoded data from the encode/decode unit 12 is applied to the delay circuit 65a. The rising of the encoded data and the rising of the laser driving pulse are offset by a period 1.5 T, as described above in the example shown in FIG. 5, for example. In FIG. 7, this period is denoted by t5.

Accordingly, in order to obtain rising of the attenuation control signal Satt from the rising of the encode data, the CPU 64 executes delay of a delay time (t3+t5) wherein the fixed time difference t5 is added to the delay time t3 obtained as described above, at the delay circuit 65a.

Also, encoded data is also supplied to the delay circuit 65b, with the CPU 64 executing delay of the delay time t4 at the delay circuit 65b.

Then, the attenuation control signal Satt indicated by (f) in FIG. 7 can be obtained by obtaining the AND of the outputs of the delay circuits 65a and 65b with the AND gate 66.

This attenuation control signal Satt is a control signal for executing accurate decay processing with regard to the reflected light information signal I2 (and I1) indicated by (c) in FIG. 7, only in periods wherein decay processing should be performed.

Though the example has described generating the attenuation control signals Satt from signals wherein encoded data is delayed, an arrangement may be made wherein the attenuation control signals Satt are generated from signals wherein laser driving pulses are delayed.

Also, the delay time measuring circuit 63 may be arranged so as to measure the time difference between the binarized reflected light information signal I2d (I1d) and the encoded data.

5. Address Error Rate

The above has been a description of an embodiment, and now description will be made regarding an address error rate improved over the present embodiment, with reference to FIG. 10.

Figure 10A:
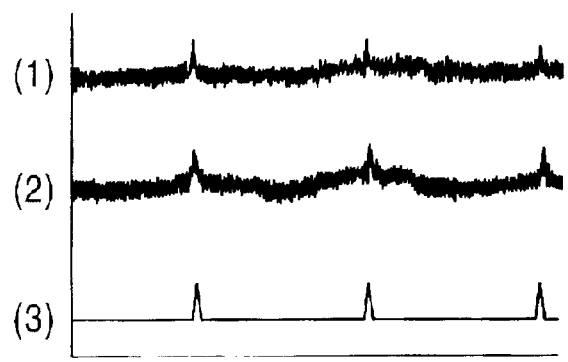
FIGS. 10A through 10C are explanatory diagrams of the signal waveform state according to the embodiment.
Figure 10B:
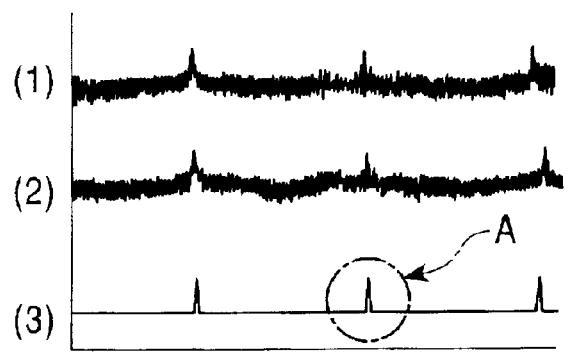
Figure 10C:
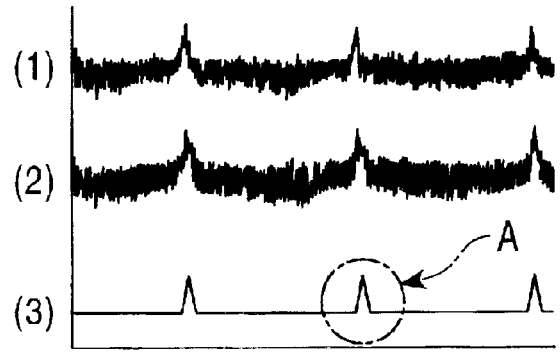
Figure 11:
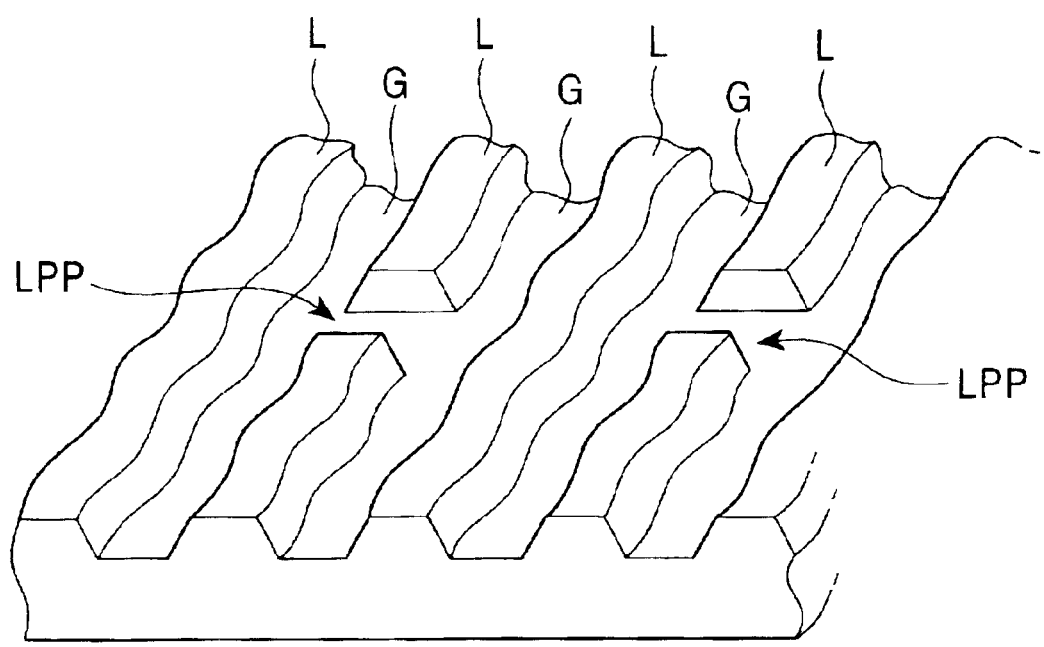
FIG. 11 is an explanatory diagram of the land pre-pit method.
Figure 12:
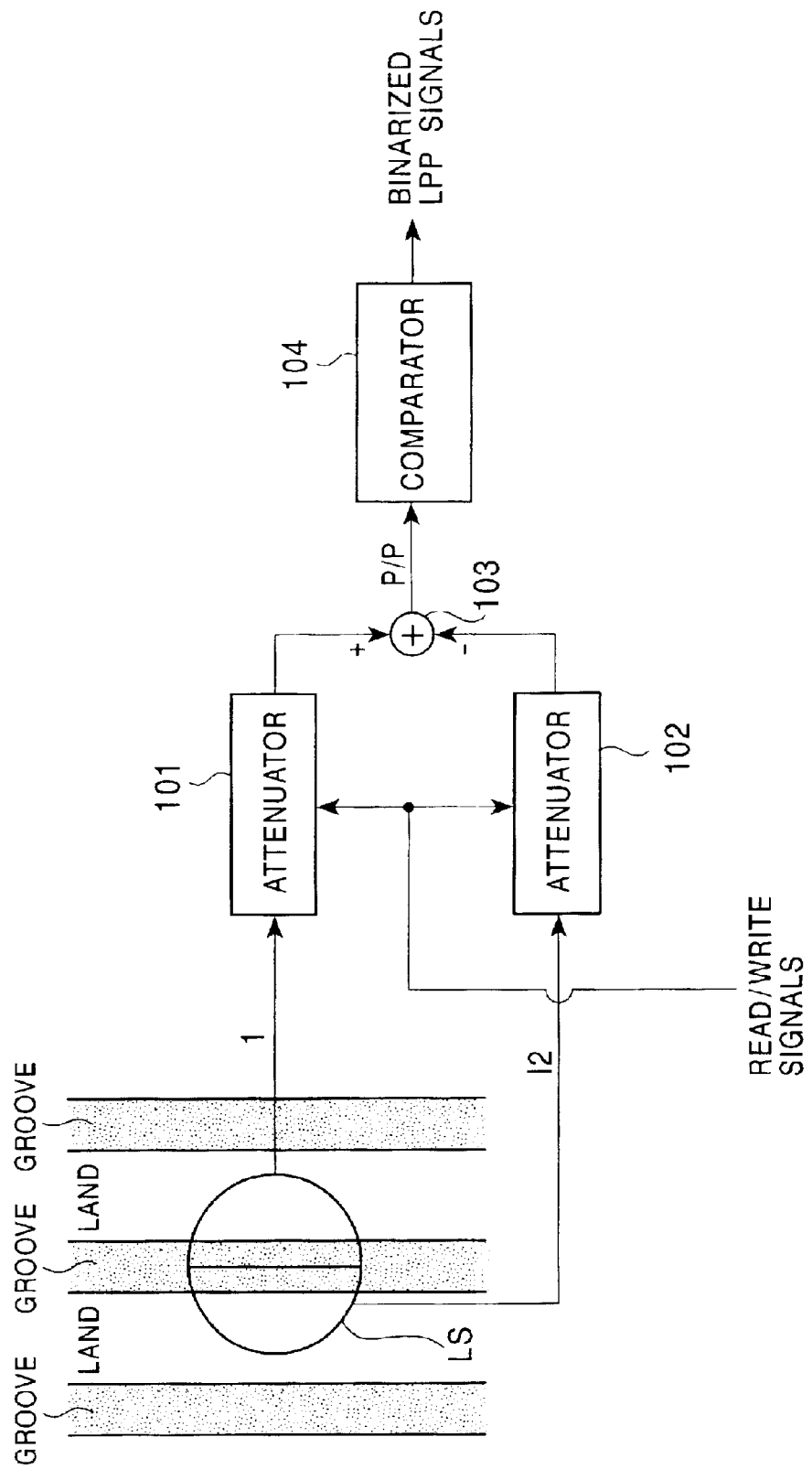
FIG. 12 is an explanatory diagram of a conventional land pre-pit information detection method.
Figure 13:
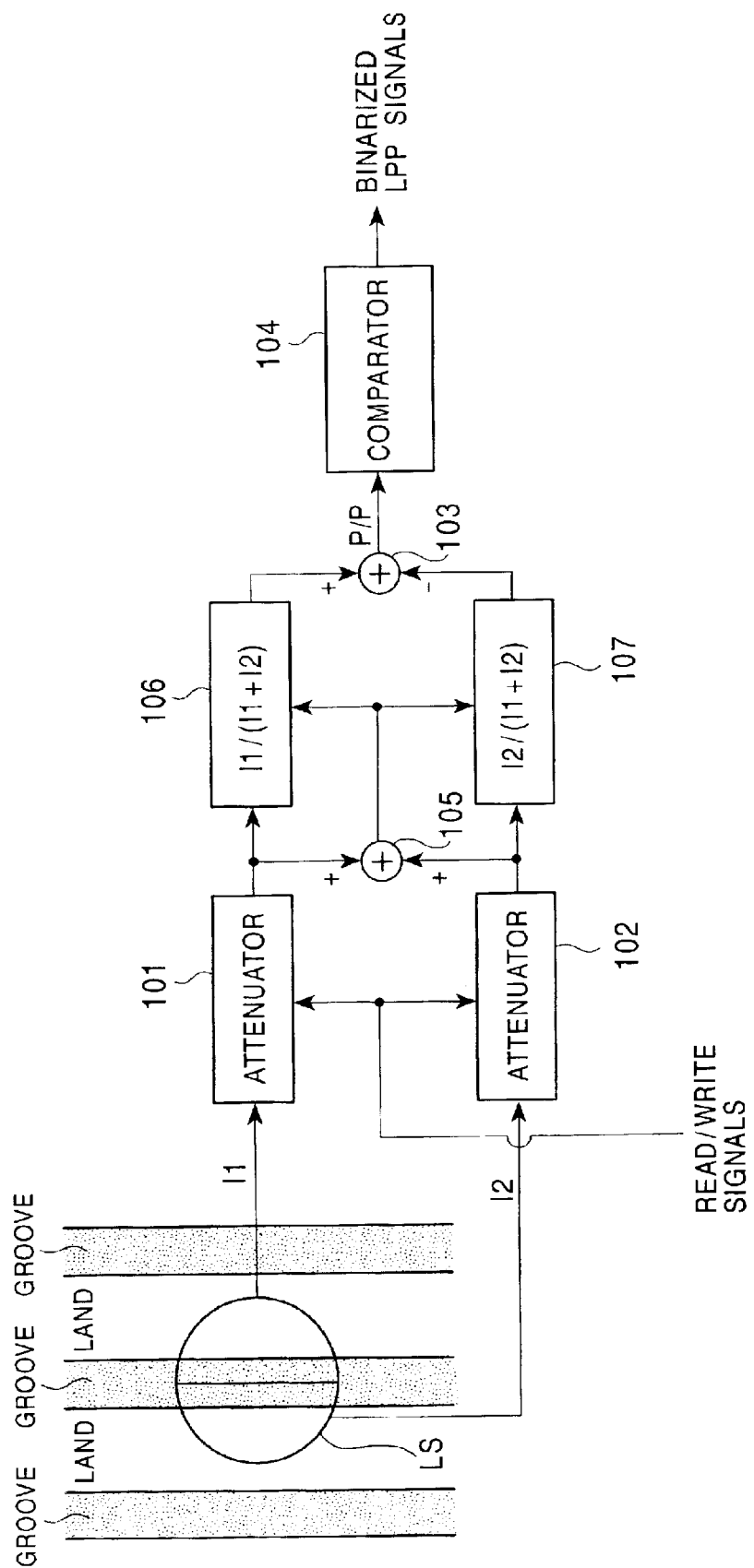
FIG. 13 is another explanatory diagram of a conventional land pre-pit information detection method.
Figure 14:
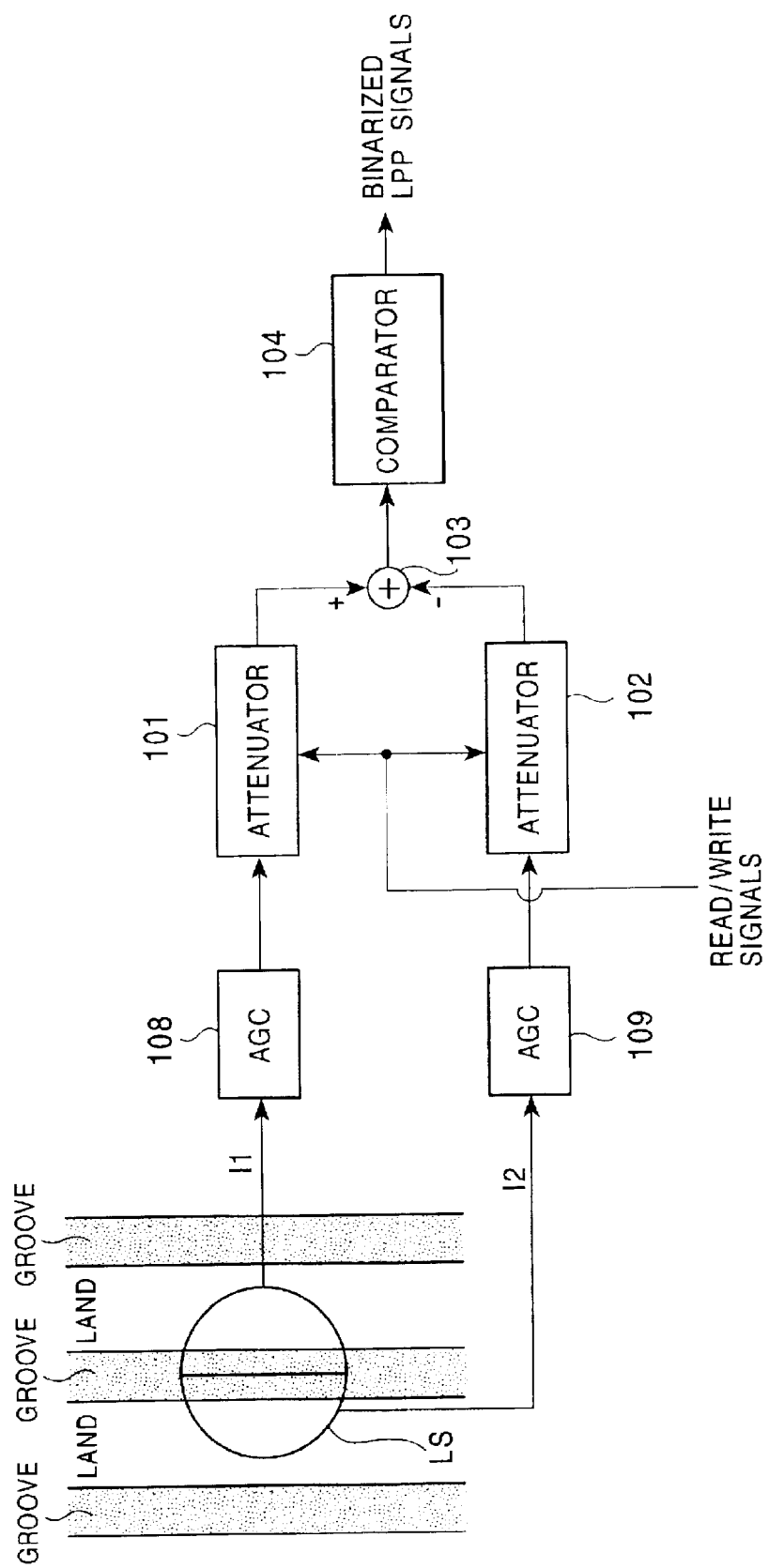
FIG. 14 is another explanatory diagram of a conventional land pre-pit information detection method.

FIGS. 10A through 10C each show (1) push-pull signals P/P, (2) push-pull signals P/P following passage through a low-pass filter, and (3) binarized push-pull signals P/P (which are land pre-pit information).

FIG. 10A shows signal waveforms in the state that the laser output is at read level, and FIGS. 10B and 10C are signal waveforms, in a state wherein the laser output is at write level during recording operations, i.e., in pit formation periods. Now, FIG. 10B illustrates a conventional land pre-pit detection method, and FIG. 10C illustrates the land pre-pit detection method according to the above-described embodiment.

In the drawings, taking note of the waveforms of the land pre-pit information indicated by (3), first, in the case of read power in FIG. 10A, gaps are observed in the waveform at portions equivalent to the land pre-pits. This is a state wherein the eye is open well, and in the state shown in this FIG. 10A address information can be extracted from the land pre-pit information almost exactly.

On the other hand, with the conventional method shown in FIG. 10B, the waveform at the portion indicated by the dotted circle A is blurred. In this case, the rate of extracting addresses accurately is around 1/50 to 10/50, which is quite poor.

In the case of the present embodiment shown in FIG. 10C, gaps are obtained in the waveform even at the portion indicated by the dotted circle A. In this state, the rate of extracting addresses accurately is 49/50 to 50/50, so that address error rate is sufficiently improved.

So far, the disk drive device according to the embodiment has been described, but the present invention is by no means restricted to the examples, and various modifications may be made within the spirit and scope of the invention.

Also, the example has been applied to extraction of land pre-pit information on DVD-Rs or DVD-RWS, but the present invention is not restricted to address extraction by land pre-pit information and is effective with regard to extraction of information which is affected by fluctuations in laser power. Of course, the disk recording medium is by no means restricted to DVD-Rs or DVD-RWS.

As can be understood from the above description, according to the present invention, during recording operations, decay processing is performed with regard to reflected light information signals during periods wherein the laser output is recording power which is comparatively high level, i.e., wherein data pits are being formed on the disk, and during recording operations, decay processing is not performed with regard to reflected light information signals during periods wherein the laser output is reproducing power which is comparatively low level, i.e., wherein the pits are not being formed on the disk. Accordingly, excellent push-pull signals can be obtained from the reflected light information signals (I1 and I2) regardless of change in the laser level during the recording operations, which is advantageous in that address information can be accurately detected in a stable manner.

Also, this is advantageous cost-wise, in that no expensive devices such as dividers are necessary.

Also, decay control signals for controlling such decay operations (control of the decay execution periods) can be generated by performing at least decay processing on encoded data or laser driving pulses, so generation is easy, and also, decay can be executed at an accurate timing by making the delay time to be a time is equivalent to the time difference between periods wherein the laser output is at recording power, and periods wherein decay processing is performed only reflected light information signals corresponding to the periods wherein the laser output is at recording power, with the decay means.

Particularly, this delay time can be adaptively set to the actual operational delay time, by being determined based on the results of comparison between the encoded data or laser driving pulses, and the reflected light information signals, thus obtaining optimal delay time.

Also, delay operations can be properly executed within periods wherein delay is necessary, by generating delay control signals such that the reflected light information signals are subjected to delay processing in periods longer than periods wherein the laser output is at recording power, based on the laser driving pulses. Particularly, the periods subjected to decay processing can be suitably controlled as periods based on the pulse width of encoded data.

Also, optimal decay taking into consideration change in amplitude of reflected light information signals can be realized by making the decay ratio to be smaller than the ratio of the recording power and reproducing power of the laser output, and particularly by making this to be 1/2 or less than the ratio of the recording power and reproducing power of the laser output.

Also, using voltage wherein reflected light information signals corresponding to periods wherein the laser output is that reducing power are subjected to sampling/holding, as reference voltage for decay processing, also contributes to optimal decay processing.

Also, detection of push-pull signals is even more suitable and by a providing first and second amplitude control means (AGC) for making constant the envelope level of the first and second reflected light information signals (I1 and I2) before the decay means.

What is claimed is:

1. A disk drive device, comprising:
   recording means for recording data on a disk-shaped recording medium by driving a laser based on recorded data;
   reflected light detecting means for detecting reflected light accompanying output of said laser and obtaining reflected light information signals;
   decay means for decaying reflected light information signals obtained by said reflected light information detecting means during recording operations of said recording means, based on decay control signals;
   address extracting means for obtaining address information from reflected light information signals decayed by said decay means; and
   decay control signal generating means for generating said decay control signals so as to execute decaying at said decay means, in a period of said reflected light information signals, corresponding to at least a period wherein the output of said laser is at recording power;
   wherein said recording means generates encoded data by encoding processing of data to be recorded, further generates laser driving pulses based on the encoded data, and drives said laser based on said laser driving pulses;
   and wherein said decay control signal generating means performs delay processing with regard to said encoded data or said laser driving pulses to generate said decay control signals.

2. A disk drive device according to claim 1, wherein said reflected light information signal comprises a first reflected light information signal and a second reflected light information signal, and said decay means has first decay means corresponding to said first reflected light information signals and second decay means corresponding to said second reflected light information signals;
   and wherein said address extracting means obtains address information from push-pull signals as the difference computation results of the output of said first decay means and the output of said second decay means.

3. A disk drive device according to claim 1, wherein the delay time in said delay processing is a time equivalent to the time difference between a period wherein the output of said laser is at recording poser, and a period wherein said reflected light information signals corresponding to a period wherein the output of said laser is at recording power are subjected to decay processing at said decay means.

4. A disk drive device according to claim 1, wherein the delay time in said delay processing is determined based on the results of comparing said encoded data or said laser driving pulses, and said reflected light information signals.

5. A disk drive device, comprising:
   recording means for recording data on a disk-shaped recording medium by driving a laser based on recorded data;
   reflected light detecting means for detecting reflected light accompanying output of said laser and obtaining reflected light information signals;
   decay means for decaying reflected light information signals obtained by said reflected light information detecting means during recording operations of said recording means, based on decay control signals;
   address extracting means for obtaining address information from reflected light information signals decayed by said decay means; and
   decay control signal generating means for generating said decay control signals so as to execute decaying at said decay means, in a period of said reflected light information signals, corresponding to at least a period wherein the output of said laser is at recording power;
   wherein said recording means generates encoded data by encoding processing with regard to data to be recorded, further generates laser driving pulses based on the encoded data, and drives said laser based on said laser driving pulses;

wherein said decay control signal generating means generate said decay control signals such that said reflected light information signals are subjected to decay processing in a period longer than a period wherein the output of the laser is a recording power based on said laser driving pulses.

6. A disk drive device according to claim 5, wherein said decay control signal generating means generate said decay control signals so that said reflected light information signals are subjected to decay processing in a period based on the pulse width of said encoded data.

7. A disk drive device, comprising:
recording means for recording data on a disk-shaped recording medium by driving a laser based on recorded data;
reflected light detecting means for detecting reflected light accompanying output of said laser and obtaining reflected light information signals;
decay means for decaying reflected light information signals obtained by said reflected light information detecting means during recording operations of said recording means, based on decay control signals;
address extracting means for obtaining address information from reflected light information signals decayed by said decay means; and
decay control signal generating means for generating said decay control signals so as to execute decaying at said decay means, in a period of said reflected light information signals, corresponding to at least a period wherein the output of said laser is at recording power;
wherein the decay ratio of said decay means is set so as to be lower than the ratio of the recording power of the output of said laser and the reproducing power thereof.

8. A disk drive device according to claim 7, wherein the decay ratio of said decay means is set so as to be 1/2 or less than the ratio of the recording power of the output of said laser and the reproducing power thereof.

9. A disk drive device, comprising:
recording means for recording data on a disk-shaped recording medium by driving a laser based on recorded data;
reflected light detecting means for detecting reflected light accompanying output of said laser and obtaining reflected light information signals;
decay means for decaying reflected light information signals obtained by said reflected light information detecting means during recording operations of said recording means, based on decay control signals;
address extracting means for obtaining address information from reflected light information signals decayed by said decay means; and
decay control signal generating means for generating said decay control signals so as to execute decaying at said decay means, in a period of said reflected light information signals, corresponding to at least a period wherein the output of said laser is at recording power;
wherein said decay means decays said reflected light information signals based on voltage from sampling/ holding of said reflected light information signals corresponding to a period wherein said laser output is at reproducing power.

10. A disk drive device according to claim 5, wherein said reflected light information signal comprises a first reflected light information signal and a second reflected light information signal, and said decay means has first decay means corresponding to said first reflected light information signals and second decay means corresponding to said second reflected light information signals;
and wherein said address extracting means obtains address information from difference computation signals of the output of said first decay means and the output of said second decay means;
and wherein said disk chive device further comprises first and second amplitude control means for making the envelope level of said first and second reflected light information signals constant, upstream from said first and second decay means.

11. A method of driving a disk drive device, comprising:
a recording step of recording data on a disk-shaped recording medium by driving a laser based on recorded data;
a reflected light detecting step of detecting reflected light accompanying output of said laser and obtaining reflected light information signals;
a decay step of decaying reflected light information signals obtained in said reflected light information detecting step during recording operations in said recording step, based on decay control signals;
an address extracting step of obtaining address information from reflected light information signals decayed in said decay step; and
a decay control signal generating step of generating said decay control signals so as to execute decaying in said decay step, in a period of said reflected light information signals, corresponding to at least a period wherein the output of said laser is at recording power;
wherein said recording step generates encoded data by encoding processing of data to be recorded, further generates laser driving pulses based on the encoded data, and drives said laser based on said laser driving pulses;
and wherein said decay control signal generating step performs delay processing with regard to said encoded data or said laser driving pulses to generate said decay control signals.

12. A method of driving a disk drive device, comprising:
a recording step of recording data on a disk-shaped recording medium by driving a laser based on recorded data;
a reflected light detecting step of detecting reflected light accompanying output of said laser and obtaining reflected light information signals;
a decay step of decaying reflected light information signals obtained in said reflected light information detecting step during recording operations in said recording step, based on decay control signals;
an address extracting step of obtaining address information from reflected light information signals decayed in said decay step; and
a decay control signal generating step of generating said decay control signals so as to execute decaying in said decay step, in a period of said reflected light information signals, corresponding to at least a period wherein the output of said laser is at recording power;
wherein said recording step generates encoded data by encoding processing with regard to data to be recorded, further generates laser driving pulses based on the encoded data, and drives said laser based on said laser driving pulses;

wherein said decay control signal generating step generates said decay control signals such that said reflected light information signals are subjected to decay processing in a period longer than a period wherein the output of the laser is a recording power based on said laser driving pulses.

13. A method of driving a disk drive device, comprising:

a recording step of recording data on a disk-shaped recording medium by driving a laser based on recorded data;

a reflected light detecting step of detecting reflected light accompanying output of said laser and obtaining reflected light information signals;

a decay step of decaying reflected light information signals obtained in said reflected light information detecting step during recording operations in said recording step, based on decay control signals;

an address extracting step of obtaining address information from reflected light information signals decayed in said decay step; and a decay control signal generating step of generating said decay control signals so as to execute decaying in said decay step, in a period of said reflected light information signals, corresponding to at least a period wherein the output of said laser is at recording power;

wherein the decay ratio in said decay step is set so as to be lower than the ratio of the recording power of the output of said laser and the reproducing power thereof.

14. A method of driving a disk drive device, comprising:

a recording step of recording data on a disk-shaped recording medium by driving a laser based on recorded data;

a reflected light detecting step of detecting reflected light accompanying output of said laser and obtaining reflected light information signals;

a decay step of decaying reflected light information signals obtained in said reflected light information detecting step during recording operations in said recording step, based on decay control signals;

an address extracting step of obtaining address information from reflected light information signals decayed in said decay step; and a decay control signal generating step of generating said decay control signals so as to execute decaying in said decay step, in a period of said reflected light information signals, corresponding to at least a period wherein the output of said laser is at recording power;

wherein said decay step decays said reflected light information signals based on voltage from sampling/holding of said reflected light information signals corresponding to a period wherein said laser output is at reproducing power.

* * * * *